United States Patent [19]

Reid et al.

[11] 4,358,828
[45] Nov. 9, 1982

[54] ENGINE SPEED MEASURING SYSTEM

[75] Inventors: David L. Reid; Dennis O. Taylor, both of Columbus, Ind.; Donald J. Brott, Winnetka, Ill.

[73] Assignee: Cummins Engine Company, Inc., Columbus, Ind.

[21] Appl. No.: 244,340

[22] Filed: Mar. 17, 1981

Related U.S. Application Data

[63] Continuation of Ser. No. 47,065, Jun. 11, 1979, abandoned.

[51] Int. Cl.³ .............................................. G01P 3/48
[52] U.S. Cl. .................................. 364/565; 73/488; 235/92 FQ; 324/166
[58] Field of Search .............................. 364/424, 565; 235/92 FQ, 92 MP, 92 DN, 92 TF; 324/166-173, 181; 73/488, 493, 494, 518

[56] References Cited

U.S. PATENT DOCUMENTS

| | | | |
|---|---|---|---|
| 3,467,821 | 9/1969 | Arp | 235/92 FQ |
| 3,525,044 | 8/1970 | Richmond | 235/92 FQ |
| 3,708,750 | 1/1973 | Bucks et al. | 235/92 TF |
| 3,710,246 | 1/1973 | Herring | 235/92 TF |
| 3,963,987 | 6/1976 | Rivere | 324/166 |
| 4,024,458 | 5/1977 | Templin | 328/133 |
| 4,052,663 | 10/1977 | Lindsey | 73/116 |
| 4,125,295 | 11/1978 | Ruhnau et al. | 364/565 |
| 4,136,558 | 1/1979 | Lukes et al. | 364/565 |
| 4,152,645 | 5/1979 | Bendler | 364/565 |
| 4,181,962 | 1/1980 | West, Jr. et al. | 364/565 |

FOREIGN PATENT DOCUMENTS 600980 4/1948 United Kingdom .
1214225 12/1970 United Kingdom .

OTHER PUBLICATIONS

Bederman; "Computer and Apparatus for Measuring Rotational Speed"; IBM Tech. Discl. Bull.; vol. 13, No. 4; Sep. 1970; pp. 1017-1018.

Primary Examiner—Errol A. Krass
Attorney, Agent, or Firm—Merriam, Marshall & Bicknell

[57] ABSTRACT

This disclosure relates to a system for measuring the instantaneous speed of an index point on a rotating part. The part may be a toothed gear or a wheel of an engine, and the index point may be an identifiable point on the part. The system comprises a sensor that is mounted adjacent the part, the sensor including two sensing elements that are spaced apart in the direction of movement of the point as the part rotates. As the point passes the sensor, it causes a first pulse to be produced by one element and then a second pulse to be produced by the other element. The system further includes circuitry that responds to the two time-spaced pulses and produces an indication of the time interval between the two pulses. This time interval is a function of the speed of the point which in turn is proportional to the rate of rotation of the part. In the instance where the part is attached to an engine flywheel, the time interval is also an inverse function of engine RPM.

14 Claims, 10 Drawing Figures

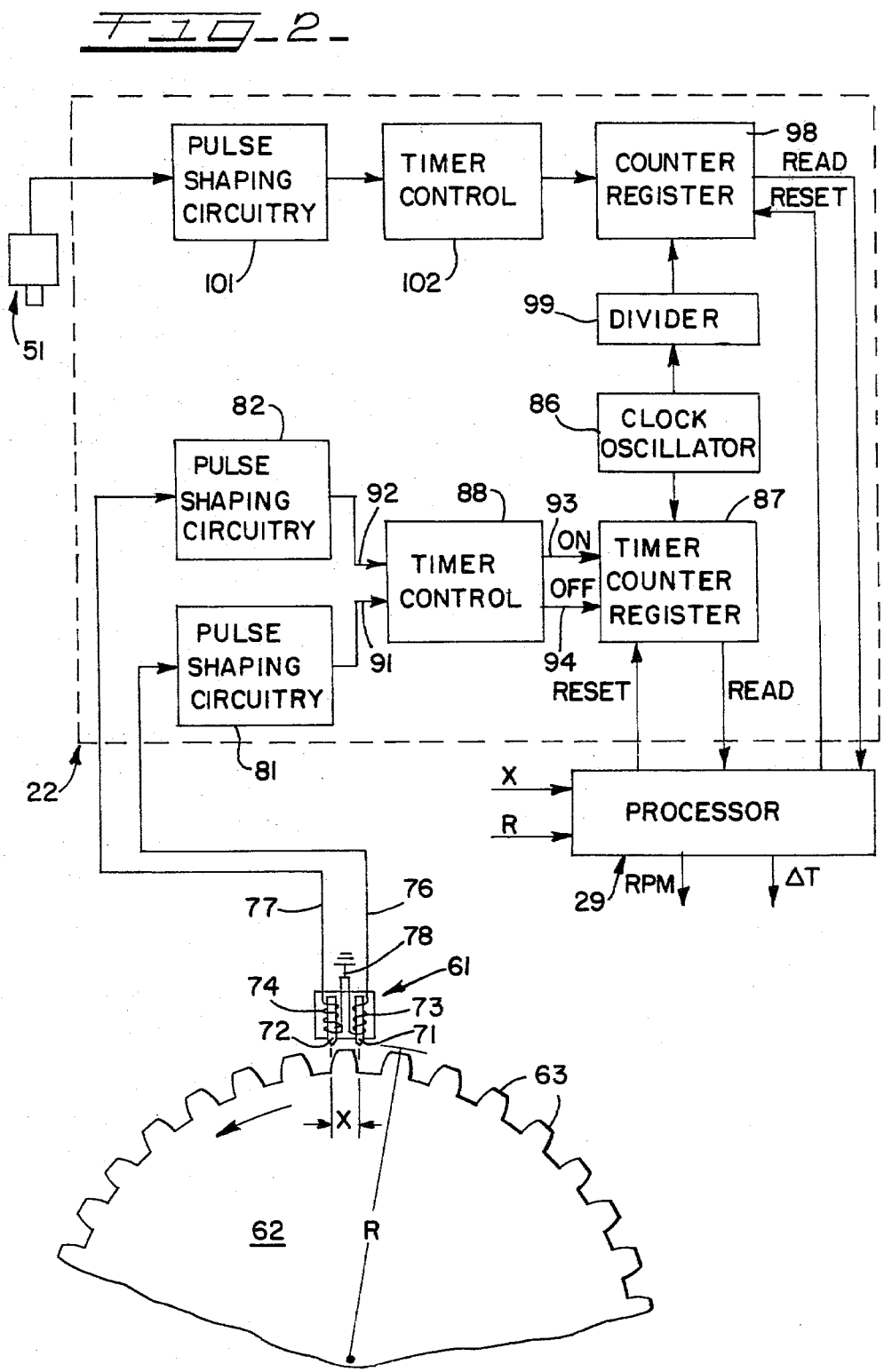

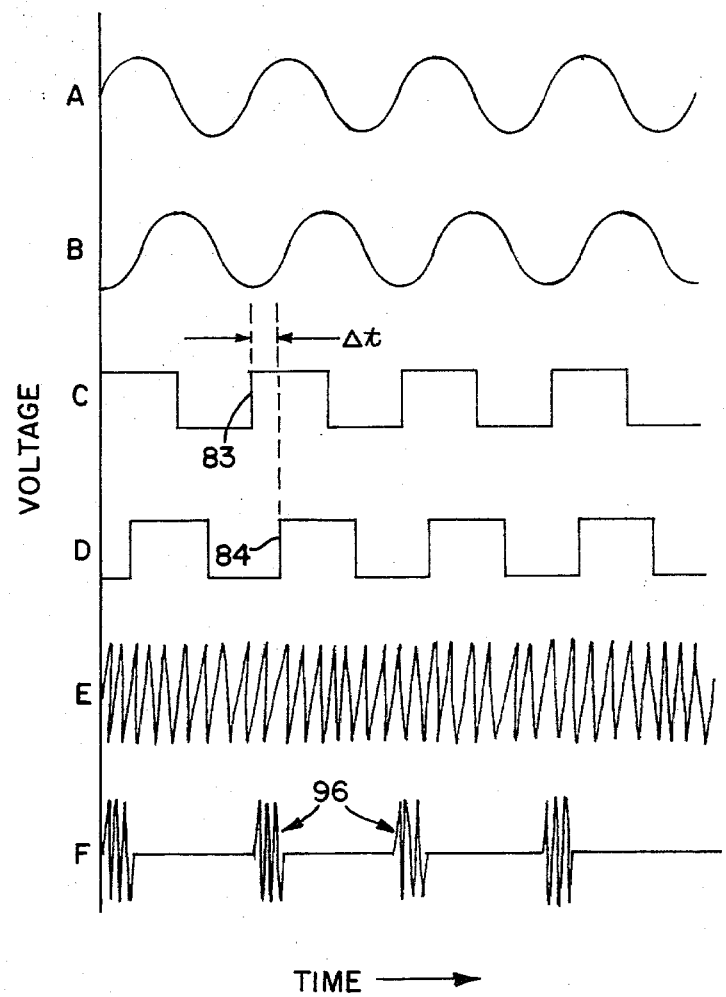
FIG_3

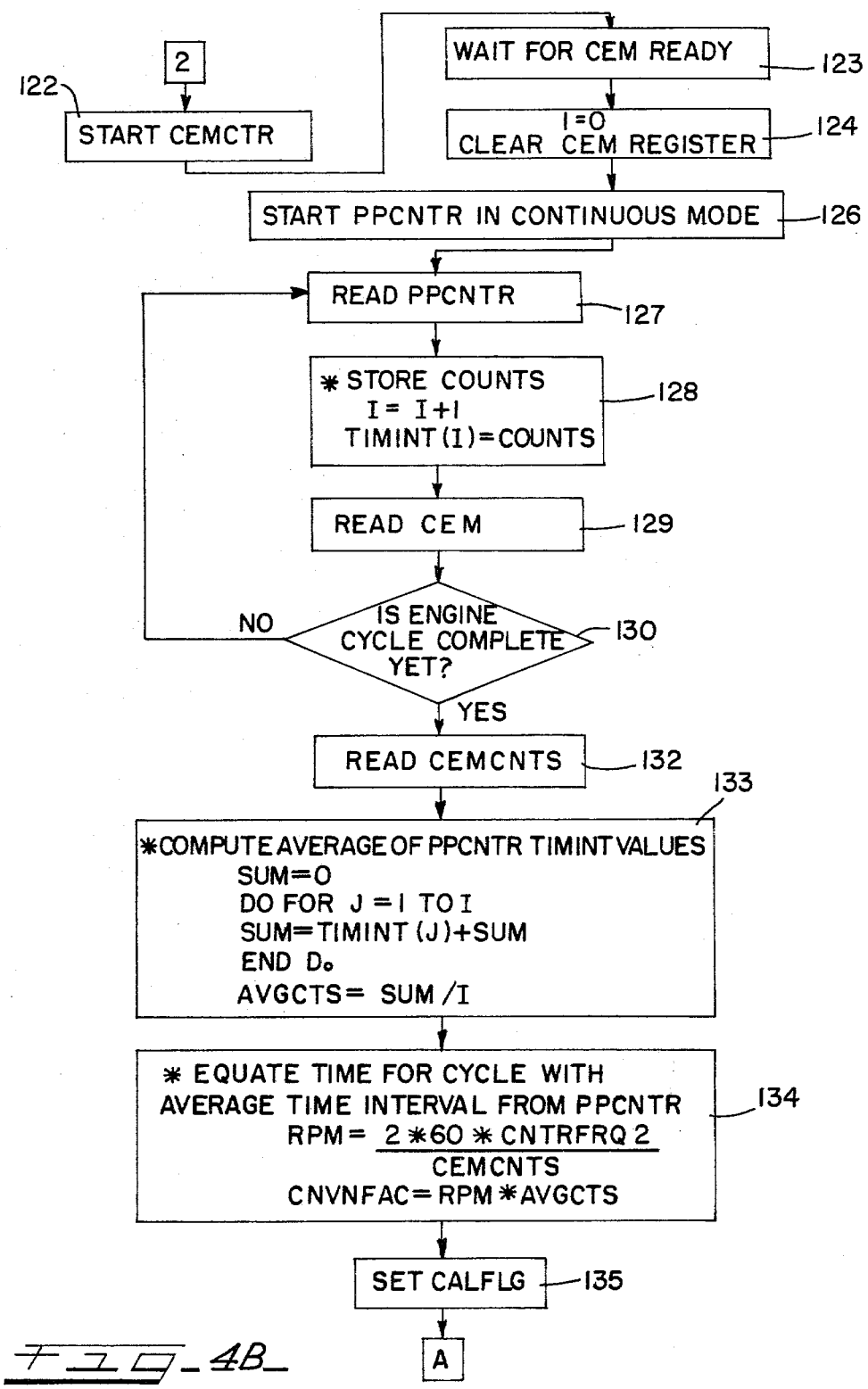
FIG_4B

ENGINE SPEED MEASURING SYSTEM

This is a continuation, of application Ser. No. 47,065, filed June 11, 1979, abandoned.

Numerous systems have been proposed for measuring the speed of a rotating part such as the crankshaft of an engine. For example, an ordinary tachometer provides an indication of average engine speed. For some functions, however, it is necessary to have an indication of the instantaneous engine speed, and the systems disclosed in the U.S. Pat. No. 4,055,993 and British Pat. No. 1,400,614 are designed to make such a measurement. Briefly, a system of the character shown in these two patents includes a magnetic sensor mounted adjacent the teeth of the flywheel ring gear of an engine, and each tooth passing the sensor generates a pulse. A circuit connected to the sensor responds to the pulses and provides an indication of the time interval between successive teeth passing the sensor, and this time interval is a function of the speed of the ring gear and of the engine. Since there are a large number of teeth on the ring gear, each time interval provides a substantially instantaneous indication of the engine speed.

Such a system has proven to be, in practice, inaccurate, primarily because the ring gear is not a precisely manufactured part and the system requires essentially identical teeth in order to make accurate measurements. The tooth size and spacing, or pitch, are not always consistant, and some areas of the ring gear are more subject to wear and to deformation than are other areas. In fact, sometimes a tooth may be missing entirely. The foregoing produces inaccurate and spurious readings of the engine speed, which in turn produces erroneous results in other tests based on the instantaneous engine speed.

It is a general object of the present invention to provide a new and improved speed measuring system which avoids the foregoing problems.

Speed measuring apparatus in accordance with the present invention comprises a sensor including two spaced sensing elements. The sensor is mounted adjacent the periphery of a rotating part of an engine and the elements are spaced in the direction of movement of an index point on the part. The two elements are utilized to determine the time interval required for the index point to move from one element to the other, and this time interval is a function of the speed of the point and the RPM of the part. The two elements sense the same point in making a time interval measurement. The part may have a large number of spaced index points and the sensor may sense the speeds of successive points and thereby be utilized to determine the instantaneous RPM of the part over a partial or full cycle.

The foregoing and other objects and advantages of the present invention will be better understood from the following detailed description taken in conjunction with the accompanying figures of the drawings wherein:

FIG. 2 is a diagramatic view including a block diagram of the system in greater detail;

FIG. 3 (A–F) is a schedule of wave forms illustrating the operation of the system; and FIGS. 4a and 4B illustrate a flow chart showing the operation of the system.

DETAILED DESCRIPTION

Figure 1:
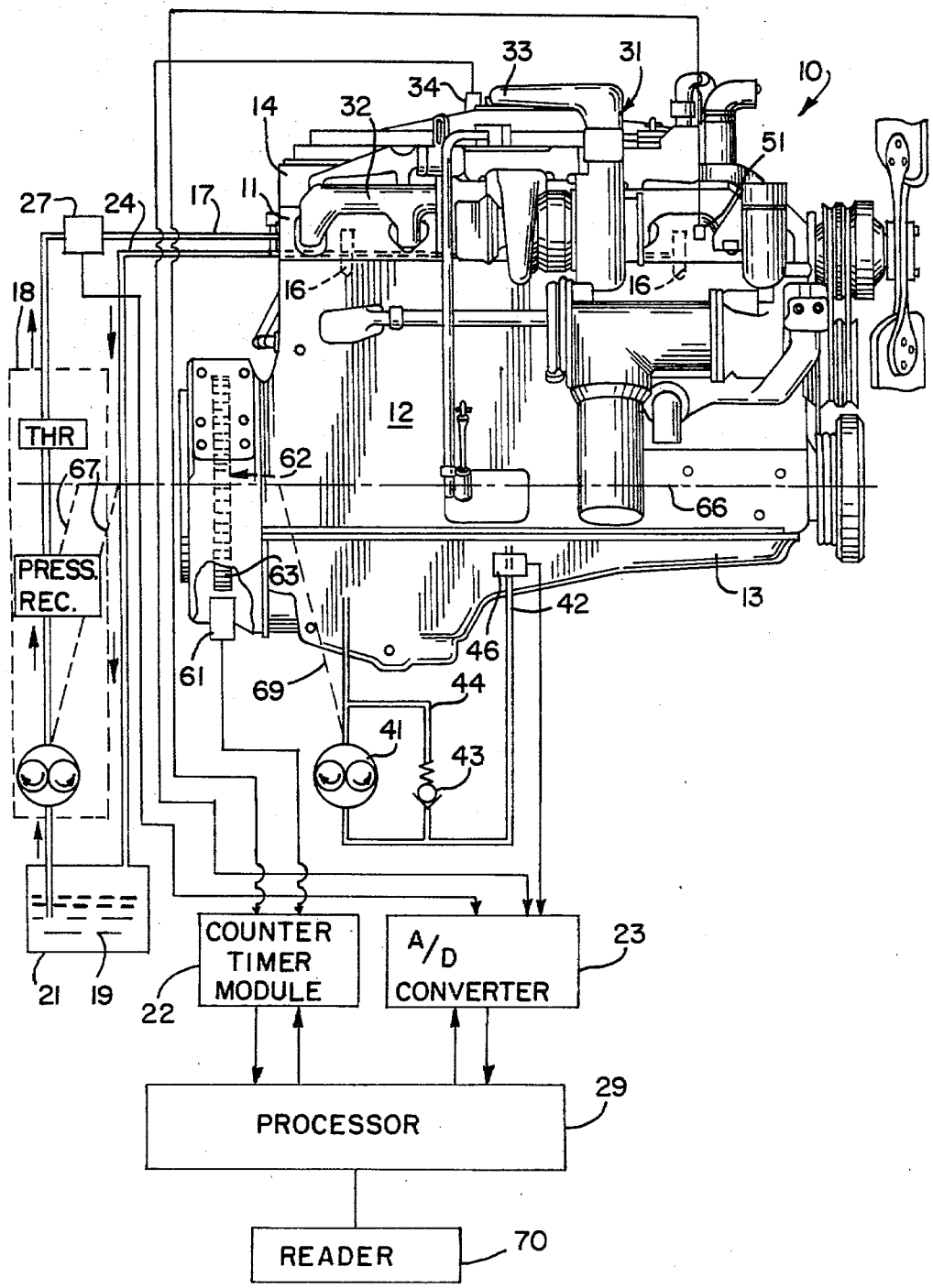
FIG. 1 is a view of an engine including a system in accordance with the present invention.

With reference to FIG. 1, an engine 10 is illustrated which may be a standard internal combustion engine such as the NH series, six cylinder, in-line reciprocating piston, diesel engine manufactured by Cummins Engine Company, Inc. Such an engine includes a head 11, a block 12, an oil pan 13 and a rocker housing 14 fastened to the upper side of the head 11. The pistons (not shown) of the engine reciprocate within cylinders (also not shown) and are connected to rotate a crankshaft 66. A flywheel on the crankshaft has a ring gear 62 attached to it, teeth 63 on the gear 62 being selectively engaged by a starter motor (not shown) for starting the engine.

A plurality of fuel injectors 16 inject metered quantities of fuel into the cylinders after inlet air within the cylinders has been compressed sufficiently to cause compression ignition of the resultant combustable mixture. The injectors 16 may be a unit type embodying the features of the injectors shown in U.S. Pat. No. 3,351,288. A common fuel supply rail 17 connects the injectors 16 with a fuel supply system including a fuel pump 18 of the character shown in the U.S. Pat. No. 3,139,875. The fuel pump 18 draws fuel 19 from a reservoir or fuel tank 21 and forms a regulated fuel source for the fuel supplied to the rail 17. A throttle is incorporated in the fuel pump 18 and permits the operator of the engine to regulate the fuel pressure delivered to the injectors. Also connected to each of the injectors 16 is a fuel return rail 24 which carries fuel from the injectors 16 to the tank 21.

The engine 10 further includes a turbocharger unit 31 which may have a conventional design. The unit 31 includes a turbine that receives engine exhaust from an exhaust manifold 32 and it further includes a compressor that is connected by a duct 33 to an air intake manifold of the engine.

The engine 10 further includes a lubricant system for circulating a lubricant such as oil through the various operating parts of the engine. The lubricant system includes a pump 41 that draws the lubricant from a reservoir in the crankcase and pan 13 and pumps the lubricant under pressure to a lubricant rifle passage 42 in the block. The pressure in the rifle 42 is regulated by a pressure regulator valve 43 connected in a bypass line 44 that is connected across the pump 41.

A number of mechanical couplings, illustrated by dashed lines in FIG. 1 and indicated by the reference numerals 67 and 69, connect the crankshaft 66 with the fuel pump 18 and the lubricant pump 41, respectively.

A diagnostic system in accordance with the present invention is provided, and includes a cycle event marker (CEM) sensor 51 which is preferably mounted in the rocker housing 14 and responds to the movement of an operating part of the engine. For example, the CEM sensor 51 may be a magnetic coil proximity type sensor that is mounted adjacent the rocker arm that actuates the injector 16 of the number one cylinder. This rocker arm pivots during injection which occurs toward the end of the compression stroke of the piston of the number one cylinder and this movement causes the sensor 51 to generate a CEM signal toward the end of the compression stroke of the piston of the number one cylinder. The CEM signal is utilized in testing engine parameters.

The diagnostic system further includes a number of engine sensors including a fuel pressure sensor 27 connected in the rail 17, a lubricant pressure sensor 46 connected in the rifle passage 42, and an intake manifold air pressure sensor 34 connected in the intake manifold. The sensor 51 is connected to a counter-timer module 22 and the sensors 27, 34 and 46 are connected to an A/D convertor 23, the components 22 and 23 being connected to the processor 29. The processor 29 provides outputs to a readout device 70 which may provide, for example, visual indications and permanent records.

The engine still further includes an engine speed measuring system in accordance with the present invention, which is particularly useful in conjunction with engine diagnostic test systems that utilize the sensors 27, 34 and 46. The speed system measures the speed of a rotating part of the engine, the part having at least one and preferably a series of identifable index points on it. In the present specific example, the part is the flywheel ring gear 62 of the engine 10. As is known to those in the art, the ring gear 62 is a relatively large gear shaped member having a plurality of teeth 63 on its outer periphery, the teeth forming the series of index points. As will be described, the speed system includes a sensor 61 that responds to movement of the teeth 63 past it, and the sensor 61 generates signals which appear on a line that connects the sensor 61 to the countertime module 22 and to the processor 29.

With reference to FIG. 2, in accordance with the present invention, the sensor 61 includes two spaced sensing elements which in the present example are poles or magnetic cores 71 and 72 having coils 73 and 74 wound around them. The coils 73 and 74 are connected between leads 76 and 77 and a common or ground connection 78. The sensor 61 is mounted with one end of each of the two elements 71 and 72 positioned closely adjacent to the outer periphery of the teeth 63 of the ring gear 62. The ring gear 62 is made of a magnetic material such as steel and when one of the teeth 63 moves past one of the elements, it changes the magnetic field through the coil on the element and thus generates an electrical pulse. As shown in FIG. 2, the sensor 61 is mounted with the two elements 71 and 72 spaced apart in the direction of movement of the teeth 63 as the ring gear 62 rotates, and consequently as each tooth 63 moves past the sensor 61, it generates an electric pulse or a signal first in the coil 73 and then in the coil 74, assuming that the ring gear 62 is rotating in the counter clockwise direction as viewed in FIG. 2.

The two leads 76 and 77 are respectively connected to the inputs of two pulse shaping circuits 81 and 82 which convert the pulses to square wave form. With reference to FIG. 3, the waveforms A and B represent the outputs of coils 73 and 74, respectively, and the waveforms C and D represent the outputs of the two pulse shaping circuits 81 and 82. Thus, the waveforms A, B, C, and D of FIG. 3 represent the variations in voltages with respect to time at the inputs and outputs of the circuits 81 and 82 as the ring gear 62 turns in the counterclockwise direction. From FIG. 3, it will be noted that the signal generated in the coil 74 lags in time the signal generated in the coil 73. This time lag or time interval is indicated by the symbol $\Delta t$ in FIG. 3 and is equal to the time difference between the leading or rising edges 83 and 84 of the signals at the outputs of the circuits 81 and 82, respectively, as a single tooth 63 moves past first the element 71 and then the element 72.

The speed system further includes a clock oscillator 86 that produces a fixed frequency signal represented by the waveform E in FIG. 3. It should be understood that the frequency of the oscillator 86 is very much higher than the pulses of the waveforms A, B, C, and D. The signal out of the oscillator 86 is fed to an input of a counter—register 87 which operates under the control of a timer control circuit 88. The timer control circuit 88 has two inputs 91 and 92 connected to the outputs of the pulse shaping circuits 81 and 82, and the control circuit 88 produces on and off signals on outputs 93 and 94 which are connected to the counter 87. When an "on" signal appears on an output 93, counter 87 receives and counts the cycles of the oscillator 86, and when an "off" signal appears on the output 94, the counter 87 stops counting the cycles. The timer control 88 produces an "on" signal on the line 93 in time coincidence with the leading edge 83 of the waveform C and it produces an "off" signal on the output 94 in time coincidence with the leading edge 84 of the waveform B. It will be apparent therefor, as illustrated by waveform F, that the counter 87 receives and counts bursts of cycles or pulses from the oscillator 86, each of the bursts being indicated by the numeral 96 in wave form F. Since the time length of a burst 96 is equal to the time interval $\Delta t$, it will be apparent that the count in the counter 87 will be a direct function of the length of the time interval $\Delta t$ and the frequency of the oscillator 86 (which is known).

The time interval count in the counter 87 is read out to the processor 29 as each count is terminated by an edge 84, and the counter 87 is reset after each readout. As will be described in connection with the flow chart of FIG. 4, the processor 29 computes the engine crankshaft speed in RPM and also produces a signal representing the time interval $\Delta t$, and these parameters are utilized in testing various engine components such as the fuel and lubrication systems, the cylinder power balance, and the turbocharger performance. The processor 29 may compute the engine speed by either of two methods: (1) utilizing the time interval count from the counter 87, the radius R from the center of the gear 62 to the elements 71 and 72, and the spacing X between the two elements 71 and 72, the parameters X and R being known and set in the processor by the system operator, or (2) utilizing the time interval count and a factor that is automatically computed by the processor 29 based on the time interval count and signals received from the CEM sensor 51.

As previously mentioned, the sensor 51 responds to a cyclically moving engine part such as the rocker arm for the injector of one of the engine cylinders. The rocker arm moves to inject fuel once in each engine cycle which, for a four-stroke engine, is once for every two revolutions of the ring gear 62.

With reference to FIG. 2 another counter 98 is provided in the module 22, which also counts the cycles of a clock oscillator. In the present example, the output of the oscillator 86 is fed to a divider 99 and then to the counter 98. The signals from the CEM sensor 51 are fed to a pulse shaping circuit 101 and a control circuit 102 and turn the counter 98 on and off. Readout and reset lines connect the counter 98 with the processor 29. A pulse from the sensor 51 causes the count in the counter 98 to be read out to the processor 29 which immediately resets the counter 98. Thus, the count in the counter 98 represents the length of time between CEM signals which is related to the engine speed. This count is also of course, a function of the oscillator 86 frequency and the divider 99 factor, which are known.

Figure 4A:
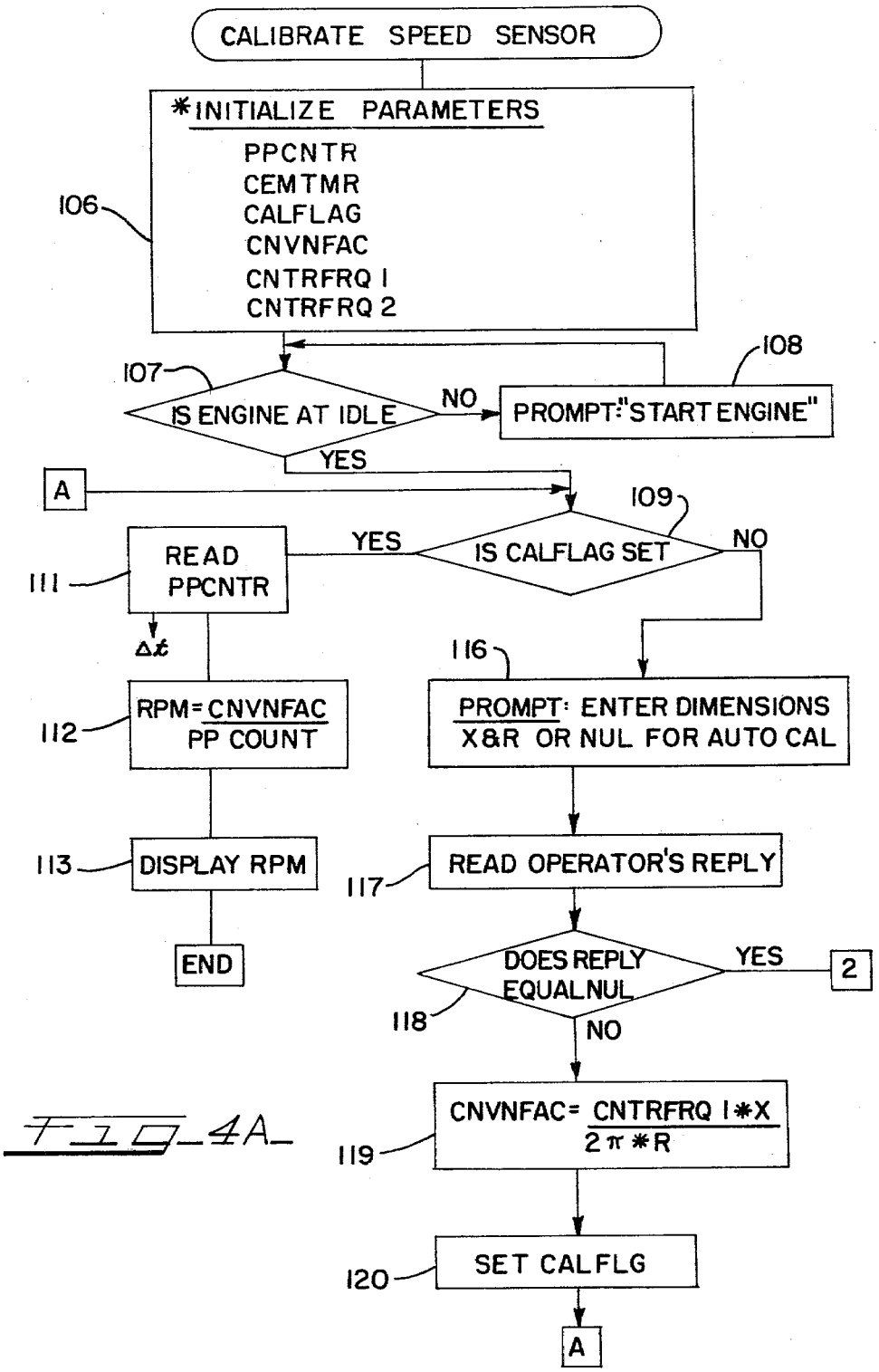

With reference to FIG. 4A, at the initial step 106, a number of system parameters are defined. The parameters shown will be described hereinafter. At step 107, the system questions whether the engine is operating and this may be determined as by sensing whether counts are being read out of the counter 87. If the engine is not operating at step 108, the operator is prompted to start the engine and set it at idle speed.

A hand held-device, or operator interface, (not shown) that is part of the read out 70 may be provided to indicate the prompts and other data and to receive the operator instructions, the hand-held device being a type of operator interface that is known in the art. If the engine is idling, the method proceeds to step 109 where it is determined whether CALFLAG has been set. The CALFLAG is set when a conversion factor (CNVNFAC) is avaiable in the system, this factor being a constant used in calculating the instantaneous engine RPM as will be described. The constant CNVNFAC may be determined automatically by the system or from information manually fed into the system by the operator.

Assuming first the situation where CALFLAG has been set, the method proceeds to step 111 where a series of readings of PPCNTR are taken from the counter 87 that measures the time intervals ($\Delta t$) for passage of a teeth 63 from one element 73 to the other element 74. At the step 111, output signals are also produced representing $\Delta t$, the $\Delta t$ signals preferably being in a binary form that is usable by the processor 29 in testing the other engine parts and systems. The $\Delta t$ counts are also passed to step 112 where the instantaneous engine RPM is calculated by dividing the factor CNVNFAC by a $\Delta t$ reading from the register 37. The notation PP COUNT indicates this reading, and is derived from pole-pole count. The RPM value is displayed at step 113 on, for example, a visual display on the handheld device.

If CALFLAG has not been set indicating that CNVNFAC is not in the system, the method proceeds to step 116 where the operator is prompted to enter either the dimensions X and R (see FIG. 2) or NUL. The system reads the operator's reply at step 117, and at step 118 the system questions whether the answer of the operator was NUL. If the decision is NO, the system proceeds to the manual calibration step 119 where CNVNFAC is calculated from the X and R values entered by the operator at step 116. CNTRFRQ is the frequency of the oscillator 86. The system then sets CALFLG at step 120 and branches back to step 109, and the RPM is calculated at steps 111, 112 and 113.

If the operator's answer is NUL, the method proceeds from step 118 to the automatic calibration routine, starting at step 122 where CEMCTR is started. This is the counter 98 (FIG. 2) that counts the pulses from the divider 99 that appear between successive CEM signals. The counter 98 also includes a CEM register that stores a count while the next succeeding count is being made, and when a count is stored, the register produces a ready signal that appears at the time of receipt of a CEM signal. This CEM ready signal is sensed at steps 123 and 124 and a calibration routine is initiated at step 124 by clearing the CEM register and setting an index I equal to zero. At step 126, the PPCNTR counter 87 is started to make continuous successive readings of the oscillator cycles during $\Delta t$. In steps 127 through 130, a series of $\Delta t$ counts are read and the number I of readings are counted between two successive CEM signals, and the $\Delta t$ counts are stored in a TIMINT buffer. The readings are initiated at one CEM signal and the systems loops through steps 127 to 130 until the second CEM signal is received, indicating that the crankshaft has turned two revolutions or one full engine cycle.

At step 132 the CEMCNTS from register 98 is read, which indicates the time for an engine cycle. At step 133, the average $\Delta t$ value (AVGCTS) for the engine cycle is calculated by totaling the $\Delta t$ values and dividing by the number I of readings between two CEM signals. At step 134, the factor CNVNFAC is calculated from the equations shown. The pulse frequency from the divider 99 is CNTRFRQ2. At the next step 135, the CALFLG is set and the system branches to step 109.

The counter-timer module 22 and the processor 29 may be conventional components sold by, for example, the Texas Instruments Company. The processor 29 is programmed according to standard programming techniques, from the flow chart and the description and drawings herein.

The system has been described in an embodiment where the two elements 71 and 72 are spaced less than the distance between successive teeth 63 on the gear 62. The elements are preferably placed very close together to obtain a more nearly instantaneous speed measurement. The elements 71 and 72 could, however, have a spacing greater than the pitch of the teeth 63, in which case multiple counters and flip-flop switches, for example, may be employed so that the counters are started and stopped by the first and second signals from a specific tooth. In the various forms of the invention, the length of time for a tooth to move from one element to the other is sensed and measured to derive the instantaneous engine speed.

While magnetic proximity sensors have been shown and described, it should be understood that other types of sensors could be used. For example, photocells could be used to sense the teeth. The sensor could be used with an engine part other than the ring gear, it only being necessary that the part have at least one index point on it. Further, a part may be attached to the engine and have index points on it, such as a disc having a series of holes or marks formed in it.

It will be apparent from the foregoing that a novel and useful instantaneous engine speed sensing system has been provided. Since each of the elements 71 and 72 of the sensor 61 generates a signal in response to the passing of a single index point, the measurements are relatively insensitive to variations between successive points. Further, even if one index point of a series of points were missing from the engine part, the present speed sensing system would still provide an accurate measurement of the instantaneous engine speed.

We claim:

1. A system for continuously sensing the instantaneous speed of an engine including a part that moves in a path of movement and at a speed related to the engine speed during operation of the engine, the part having at least one index point thereon, said system comprising a sensor adapted to be mounted on the engine adjacent the moving part, said sensor including two spaced sensing elements mounted thereon at fixed locations, said sensor being adapted to be mounted with said two elements spaced apart along said path and in the direction of movement of the index point as the part moves, said elements providing a pair of signals when the index point moves past said sensor, and processor means connected to said two elements for substantially continuously determining instantaneous engine speed, said processor means including oscillator means, counter means connected to receive the output of said oscillator means and to count the cycles of oscillation thereof, means connected to receive said signals from said two spaced sensing elements and to measure the time interval therebetween, means for calculating a conversion factor based on the frequency of said oscillator means, and means for calculating the instantaneous engine speed by dividing said conversion factor by said time interval.

2. A system as in claim 1, wherein said each of said elements comprises a magnetic proximity sensor.

3. A system as in claim 1, wherein said part is attached to and rotates with the engine flywheel and has a plurality of spaced index points thereon, said system sensing said engine speed a plurality of times in each revolution of the engine.

4. A system as in claim 1, wherein said part is the ring gear and said index points are the gear teeth, said system sensing said engine speed a plurality of times in each revolution of the engine.

5. A system as in claim 1, wherein said part rotates an axis, and said elements are spaced a distance R from said axis and are spaced apart a distance X, and said processing means further receives the dimensions R and X.

6. A system as in claim 1, wherein said system further includes sensor means responsive to a cyclically moving engine part for generating cycle event marker (CEM) signals, one of said CEM signals being generated in each cycle of the engine and marking the movement of the engine part in each cycle of the engine, and said processing means including means to calculate the average engine speed between two of said CEM signals, and means for producing said instantaneous engine speed from said counts and from said average engine speed between CEM signals.

7. The method of continuously sensing the instantaneous speed of an engine having a part that rotates on an axis and has a plurality of index points on the outer periphery thereof, comprising the steps of sensing when the index point passes a first element, sensing when said point passes a second element which is spaced from said first element, making a time measurement by counting cycles of an oscillator, calculating a conversion factor based on the frequency of the oscillator, providing a signal representative of the time interval for said point to move from said first element to said second element, and calculating said instantaneous speed by dividing said conversion factor by said signal representing said time interval.

8. The method of claim 7, wherein said signal representing said time interval is derived from said time measurement derived by counting cycles of said oscillator, said first and second elements being at a radius R on said axis and spaced apart a distance X, and said conversion factor being further based on the dimensions X and R.

9. The method of claim 7, and further including the step of measuring the average speed of the engine over a cycle using said time measurement derived by counting cycles of said oscillator, deriving the average of said time intervals over a cycle, said conversion factor further being based on said average speed and on said average time interval.

10. A system for determining the instantaneous speed of an engine including a part that rotates on an axis with the engine during operation thereof, the part having at least one index point thereon, said system comprising a sensor adapted to be mounted on the engine adjacent said part, said sensor including two spaced sensing elements and adapted to be mounted with said two elements spaced apart in the direction of movement of the index point as the part rotates, each of said elements producing a signal each time an index point moves past said sensor, said two elements being spaced apart a distance X and being at a radius R from said axis, and processing means including first means receiving each of said signals and indicating the time interval therebetween, second means forming a conversion factor computed from X and R, and third means receiving said time intervals and said conversion factor and producing the instantaneous engine speed therefrom.

11. A system as in claim 10, wherein said first means includes an oscillator and a counter for counting the cycles of oscillation between a pair of signals, and said second means further receiving the cycles of oscillation of said oscillator.

12. A system as in claim 10, wherein said part is an engine flywheel and has a plurality of teeth thereon, and said elements comprise two magnetic sensors spaced apart a distance that is less than the pitch of the teeth.

13. A system for determining the instantaneous speed of an engine including a part that rotates on an axis with the engine during operation thereof, the part having at least one index point thereon, said system comprising a first sensor adapted to be mounted on the engine adjacent said part, said first sensor including two spaced sensing elements and adapted to be mounted with said two elements spaced apart in the direction of movement of the index point as the part rotates, each of said elements producing a signal each time an index point moves past said first sensor, a second sensor adapted to be mounted adjacent an engine part that moves cyclically during engine operation, said second sensor responding to said movement and generating a CEM signal for each cycle of the engine, and processing means receiving said signals from said elements and including first means responsive to said signals and indicating the time interval therebetween, said processing means further receiving said CEM signals, second means responsive to two CEM signals and to said time intervals for determining the average time interval between said CEM signals, third means responsive to two CEM signals for determining the average engine speed between said two CEM signals, fourth means for determining a conversion factor based on said average speed and said average time interval, and fifth means for determining instantaneous speeds based on said conversion factor and said time intervals between pairs of signals.

14. A system as in claim 13, wherein said part is an engine flywheel and has a plurality of teeth thereon, and said elements comprise two magnetic sensors spaced apart a distance that is less than the pitch of the teeth.

* * * * *